Jan. 27, 1959  H. MUTCHNIK  2,871,077
WEDGE FASTENER ASSEMBLIES
Filed March 14, 1955  4 Sheets-Sheet 1
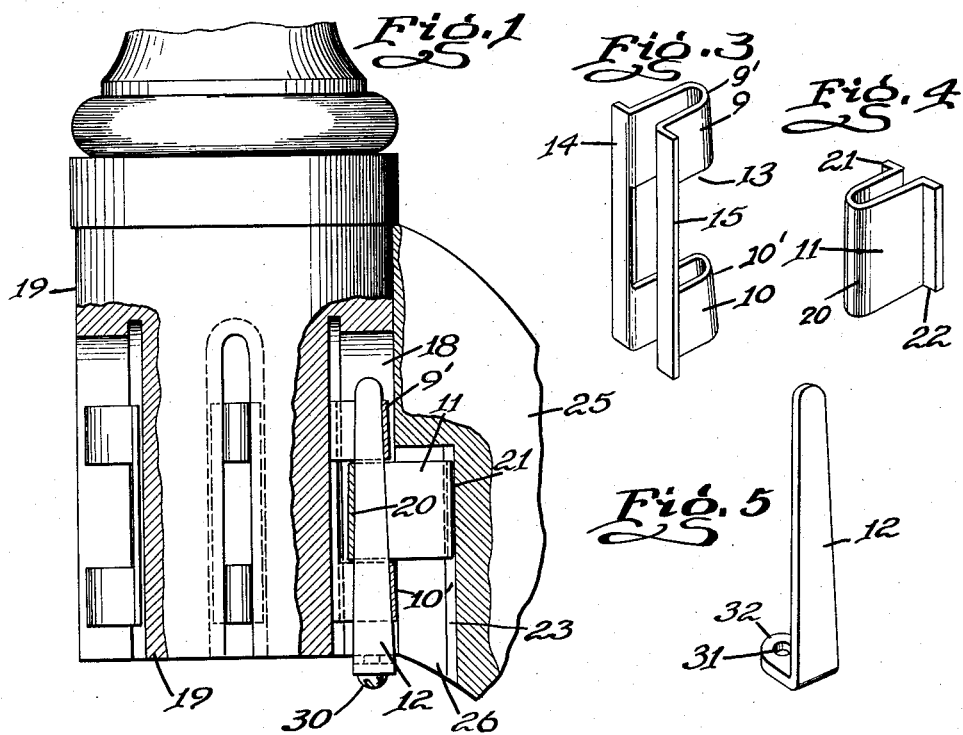
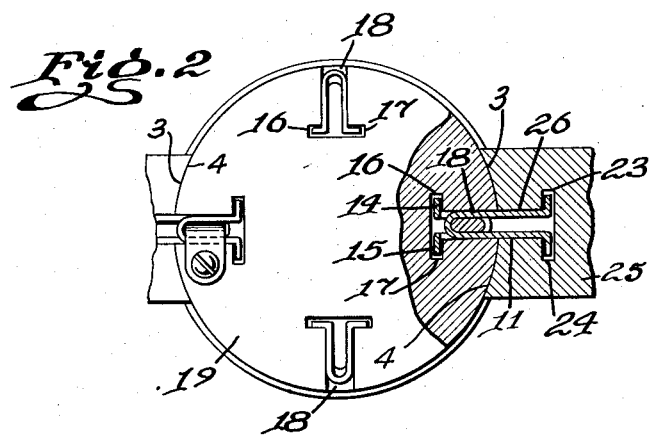
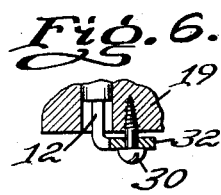
INVENTOR.
Henry Mutchnik
BY Victor J. Evans & Co.
ATTORNEYS

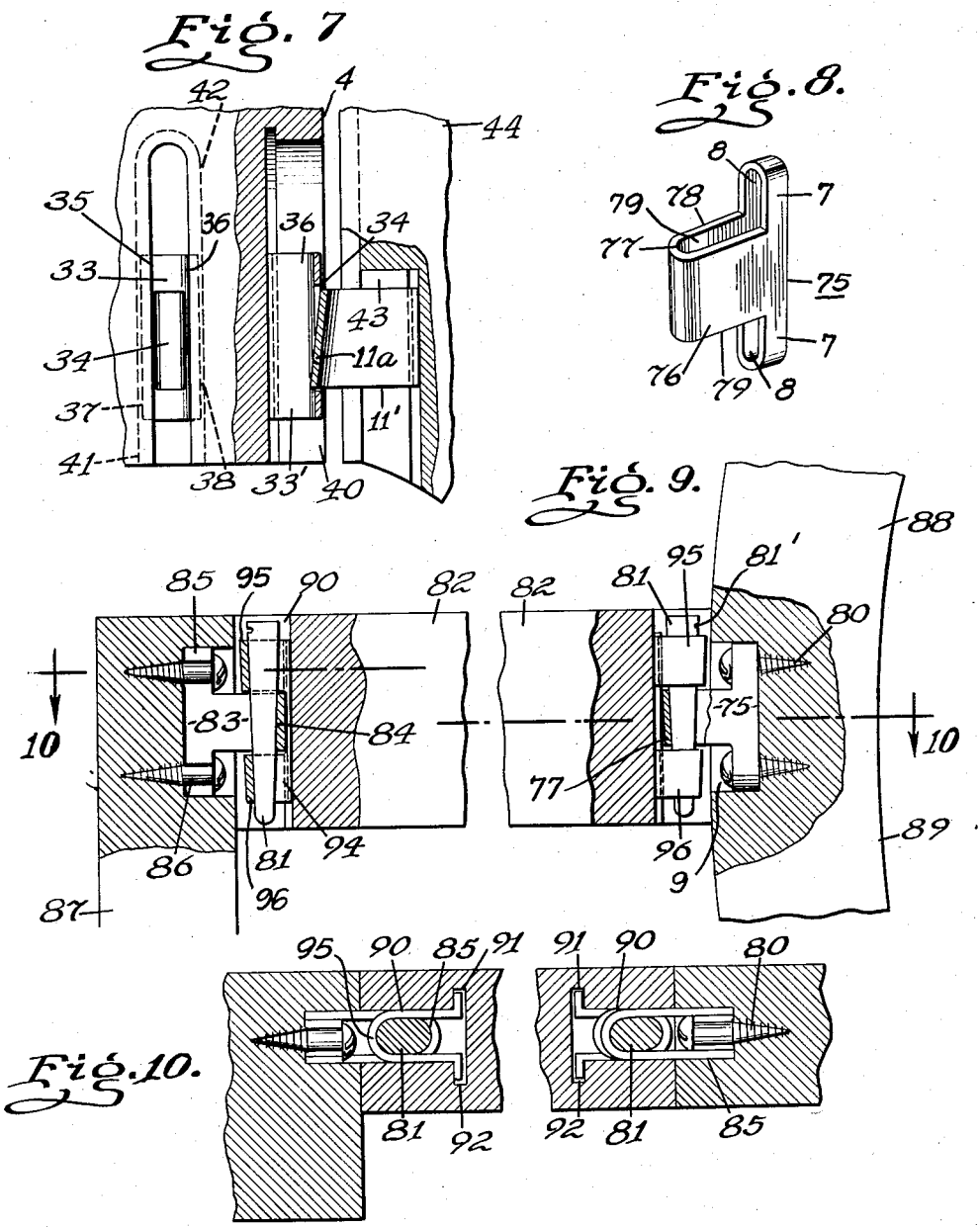

Jan. 27, 1959  H. MUTCHNIK  2,871,077
WEDGE FASTENER ASSEMBLIES
Filed March 14, 1955  4 Sheets-Sheet 3
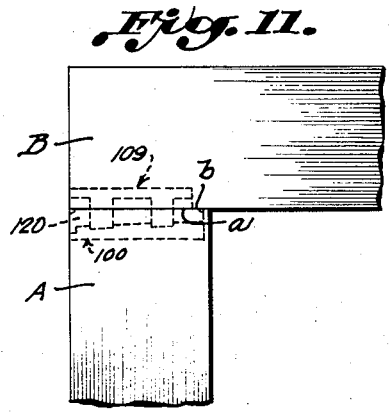
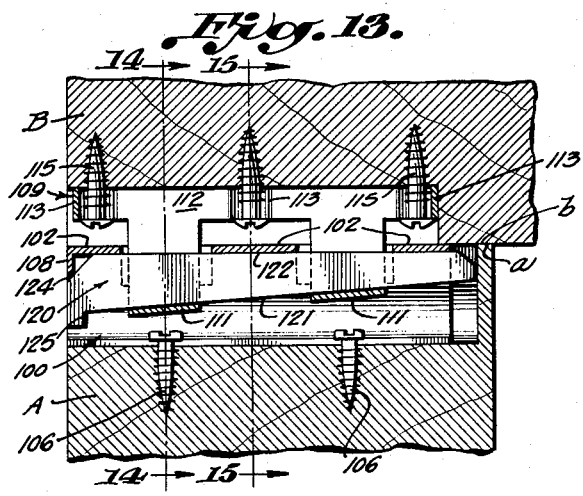
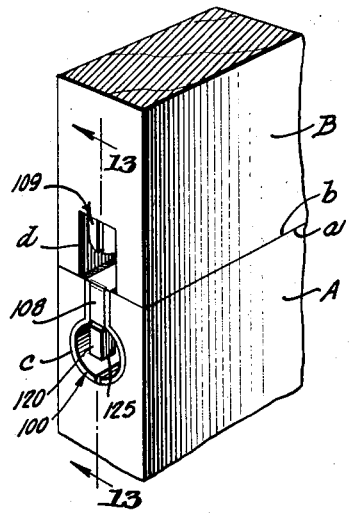
 
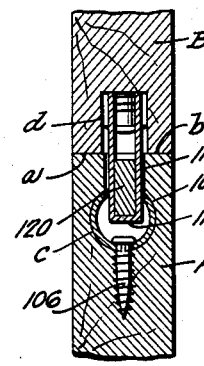 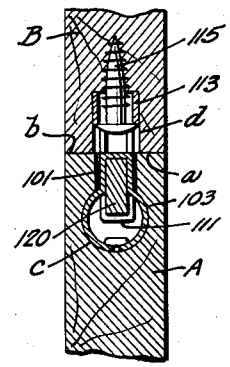
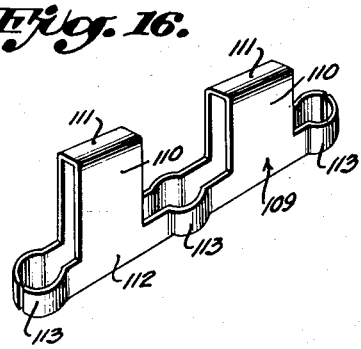
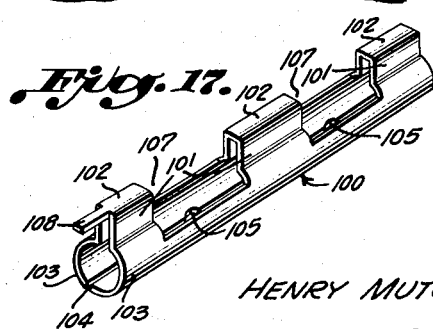
INVENTOR
HENRY MUTCHNIK
BY
ATTORNEY

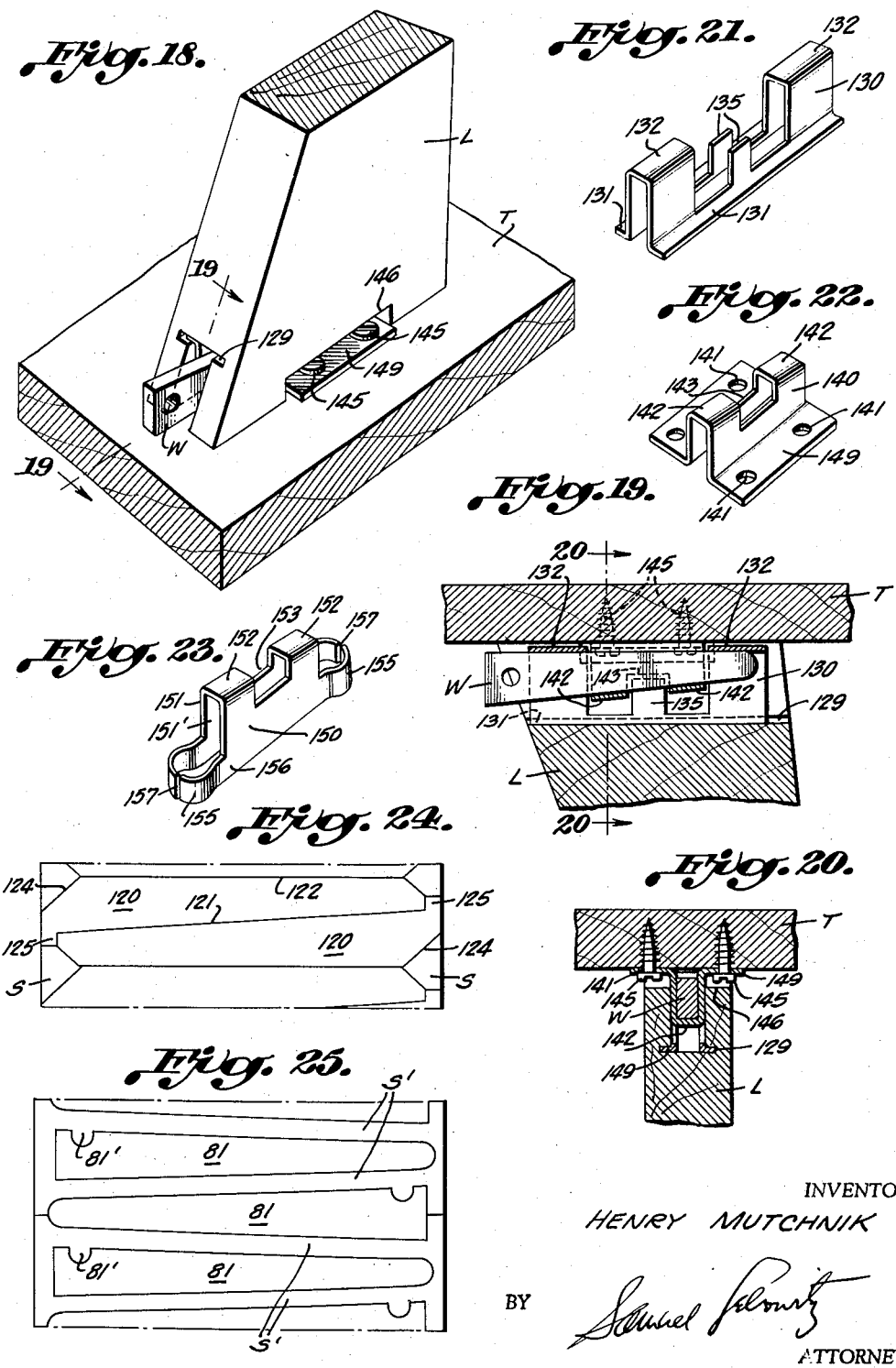

United States Patent Office 2,871,077
Patented Jan. 27, 1959

2,871,077

WEDGE FASTENER ASSEMBLIES

Henry Mutchnik, Baltimore, Md.

Application March 14, 1955, Serial No. 494,208

8 Claims. (Cl. 311—110)

This invention relates to wedge type fastener assemblies for interconnecting structural members of all types and particularly furniture units.

It is the object of the present invention to incorporate in furniture units a fastener assembly which is rugged and economical in construction and which is reliable in operation to maintain a secure fastening between structural members of wood, metal, plastics or other materials of which furniture may be built.

It is another object of the invention to provide a fastener assembly which may be stamped from sheet metal and which does not require any close manufacturing tolerances in order to obtain a tight interconnection between the parts to which the assembly may be applied. The fastener assembly is self-compensating in use and may be tightened periodically in order to maintain an effective interengagement between the parts.

The invention makes possible the convenient shipment of furniture units in knock-down condition for rapid assembly at the final destination. Furthermore, glueing, dowelling, corner blocking and other costly furniture manufacturing expedients are eliminated. The use of nuts, bolts and reenforcing bars are avoided. The fastener assemblies incorporated in the furniture units in accordance with the invention are completely hidden from view in the assembled condition of the furniture and the joints formed therewith maintain a tight contact between abutting surfaces, which condition obtains for long periods of time, and which lends itself to tightening as wear takes place.

The invention proceeds upon the principle of utilizing an extended area of contact between a female wedge receiver of stamped sheet metal in the form of a plurality of spaced loops, which is adapted to be affixed to one structural member, and which is interengaged with a male wedge receiver which may be affixed to another structural member, the two wedge receivers being integrated by means of a flat sheet metal wedge, to produce a fastener assembly which is effective over substantial areas of its edges or surfaces so that the active portions of the fastener are widely distributed, do not cause any wear at any sharp points or edges, and may be shifted from time to time to tighten the interconnection between the parts as wear in the assembly takes place, which is not precluded by any worn points, edges or surfaces of the fastener assembly.

In accordance with the invention, a secure fastening between two structural units of a furniture assembly at their abutting surfaces is obtained by seating a female wedge receiver within a recess in one of the structural units, which receiver does not extend beyond the abutting surfaces of this unit, and interengaging therewith a male wedge receiver which is affixed to another furniture unit. The male receiver extends beyond the abutting surface of the last-mentioned unit into the recess of the first structural unit where it interengages with the female wedge receiver to form a continuous narrow passage for receiving a flat sheet metal wedge having opposed relatively inclined straight edges which act upon cooperating surfaces of the female and male wedge receivers to press the furniture units into tight contact at their abutting surfaces.

It is another object of the invention to provide for locking the wedges in place, as well as for facilitating the withdrawal of these wedges whenever desired.

It is also an object of the invention to provide sheet metal wedges which lend themselves to locking in place and convenient withdrawal, and which may be stamped from metal sheets with substantially no waste of material.

Other objects and purposes will appear from the detailed description of the invention following hereinafter, taken in conjunction with the accompanying drawing, wherein Fig. 1 is a front elevation with certain parts in section, illustrating one embodiment of the invention for detachably fastening table legs to the pedestal of a table;

Fig. 2 is a bottom view of Fig. 1 including the abutting portion of an additional leg, with certain parts in section;

Fig. 3 is a perspective view of one form of female wedge receiver which may be seated within the recesses of the pedestal shown in Figs. 1 and 2;

Fig. 4 is a perspective view of the male wedge receiver which may be affixed to the table leg, as shown in Figs. 1 and 2;

Fig. 5 is a perspective view of the sheet metal wedge cooperating with the receivers shown in Figs. 1 to 4;

Fig. 6 is a sectional view of the detail shown at the lower end of Fig. 1 with parts in elevation, illustrating the positive locking of the wedge in position;

Fig. 7 is a vertical sectional view, with parts in elevation, of a second embodiment of the invention for fastening the legs of a pedestal table to the central pedestal, utilizing a different form of female wedge receiver;

Fig. 8 is a perspective view of a different embodiment of the male wedge receiver which may be seated within a recess of the table leg;

Fig. 9 is a sectional view, with certain parts in elevation, illustrating the interconnection of a seat frame or rail to a chair back and leg;

Fig. 10 is a horizontal sectional view along line 10—10 of Fig. 9;

Fig. 11 illustrates another embodiment of the invention for interconnecting two structural frame members of furniture or analogous articles which have abutting surfaces;

Fig. 12 is a perspective view of the left end of Fig. 11;

Fig. 13 is a vertical sectional view of the structural assembly along line 13—13 of Fig. 12;

Fig. 14 is a vertical sectional view along line 14—14 of Fig. 13;

Fig. 15 is a vertical sectional view along line 15—15 of Fig. 13;

Fig. 16 is a perspective view of the male wedge receiver seated within a recess of the upper structural member shown in Figs. 11 to 15;

Fig. 17 is a perspective view of the female wedge receiver seated within a recess of the lower structural member shown in Figs. 11 to 15;

Fig. 18 is a perspective view of another embodiment of a wedge fastener assembled which may be applied between a table top and the leg of a table;

Fig. 19 is an obverse view of Fig. 18 taken along line 19—19 thereof;

Fig. 20 is a vertical sectional view along line 20—20 of Fig. 19;

Fig. 21 is a perspective view of the female wedge receiver seated within a recess of the table leg, as shown in Figs. 18 to 20;

Fig. 22 is a perspective view of the male wedge receiver affixed to the under surface of the table top for interengagement with the female wedge receiver, as shown in Figs. 18 to 20;

Fig. 23 is a perspective view of a variation of the male wedge receiver shown in Fig. 22 and designed for seating within a recess of the table top;

Fig. 24 is a plan view of the stamped sheet metal wedges used in the fastener assembly illustrated in Figs. 11 to 17; and Fig. 25 is a plan view of the stamped sheet metal wedges which are used in the assemblies shown in Figs. 9 and 10.

In Figs. 1 to 6 of the drawings is illustrated one exemplary embodiment of the invention in which wedge fastener assemblies in accordance with the invention are used for interconnecting the legs 25 to the pedestal 19 of a table to obtain a secure fastening between the respective abutting surfaces 3 and 4 of the legs and the pedestal. The drawing illustrates provision for the attachment of four legs to the pedestal, the fastenings of which are all identical. Slots of T-shaped cross-section extend upwardly and equidistantly from the bottom edge of the pedestal. These slots are composed of a shaft portion 18 and head portions 16 and 17 into which are adapted to be slid an integral female wedge receiver as shown in Fig. 3, composed of sheet metal loops 9 and 10 spaced from each other by the space 13 therebetween and united by the laterally extending flanges 14 and 15 which are adapted to be received in slots 16 and 17, while the U-shaped sheet metal loops 9 and 10 are received within the portion 18 of the recess in the pedestal. The distal edges of the loops 9 and 10 are angularly disposed with respect to the plane of the flanges 14 and 15 along a straight line converging from the lowermost end of loop 10 towards the uppermost end of loop 9. A male wedge receiver 11, provided with flanges 21 and 22, is adapted to be seated within a T-shaped slot in the leg 25. The slot is formed with the shaft portion 26 and the head portions 23 and 24, the latter of which receive the flanges 21 and 22. The distal edge 20 of the male wedge receiver 11 may be parallel to the plane of the flanges 21 and 22 or may be inclined relatively thereto to define a converging passage between the distal edges 9', 10' and distal edge 20 when the male wedge receiver 11 is interengaged with the female wedge receiver to dispose the former within the space 13 disposed between the loops 9 and 10, as shown in Fig. 1. In Fig. 1, the distal edge 20 is inclined similarly to the distal edge 9' and 10' to form the converging substantially rectangular passageway with the side walls of the loops 9, 10 and 11, for the reception of a sheet metal wedge 12. The insertion of this wedge upwardly through the loops 10, 11 and 9 gives rise, in consequence of the opposed relatively inclined edges thereof acting upon the distal edges of the loops, to a tight interengagement of the parts, to force the abutting surfaces 3 and 4 into tight contact with each other.

The principles involved in obtaining this tight interengagement of the parts over large areas is fully explained in my copending application, Serial No. 481,933, filed January 14, 1955.

As shown in Fig. 5, the flat sheet metal wedge 12 may be provided with a lateral offset terminal 32 having an opening 31 therein to receive a screw 30 which may be fastened into the base of the pedestal 19 to positively lock the wedge 12 in place (Fig. 6)

Fig. 7 illustrates a different embodiment of a female wedge receiver which is formed from an integral strip of sheet metal and is stamped to form opposed side walls 35 and 36 with lateral flanges 37 and 38 extending from the base thereof for engagement with the head portion of the T-shaped slot 40, 41, and 42 which is grooved in the base of the pedestal 19. The distal end 33 of the wedge receiver is stamped out at the mid-portion 34 thereof to provide U-shaped loops at the ends of the receiver, the distal portions of which extend in parallel to the flanges and the head end of the T-shaped slot, and are disposed within the recess 40 so that no portion thereof extends beyond the abutting surface 4 of the pedestal.

The male wedge receiver 11' is disposed in a T-shaped slot 43 in the leg 44. This wedge receiver is provided with flanges for seating in the head portion of the T-shaped slot, with the distal portion 11a thereof inclined relative to the distal portions of the female wedge receiver 33. The length of the male wedge receiver 11' is slightly less than the length of the intermediate opening 34 between the loop portions 33 of the female wedge receiver so that the two wedge receivers may interengage and provide a rectangular passage 33' for the flat sheet metal wedge, the opposite edges of which have an inclination corresponding to the angularity between the distal portions of the female wedge receiver and the male wedge receiver. Preferably the contact lines between the opposed edges of the flat sheet metal wedge and the distal portions of the U-shaped sheet metal loops are at least four times as great as the thickness of the wedge and the spacing between the side walls of the loops so that the wear between the parts is distributed over large extents, eliminating any cutting action between the wedges and the loops, enabling compensation for wear to be undertaken at all times.

In the embodiments described above, the provision of lateral flanges on the female and male wedge receivers which are interfitted in the head portions of the T-shaped slots provided in the pedestal and legs of the table, makes possible the affixation of the wedge receivers and the U-shaped sheet metal loops formed therein to the respective structural members at the proximal parts of the sheet metal lops without need for any extraneous fastening.

In Fig. 8 is illustrated a male wedge receiver 75 formed as a U-shaped sheet metal loop having side walls 76 and 78 and distal portion 77 which affords a rectangular passage 79 therein for the accommodation of the sheet metal wedge. The sheet metal loop in this case merges with the base extensions 7 projecting from the opposite edges of both the walls 76 and 78 which together form a support for seating the base 7 within a groove formed in the structural member and which may be retained in the groove by means of screws driven into the passages 8 between the side walls of the base adjacent to the terminals thereof. The distal portion 77 may be parallel to, or inclined relative to the base portion 7, depending upon whether the same cooperates with a female wedge receiver which is inclined or parallel to the base 7, respectively. Thus, if the unit 75 were to be used in the assembly shown in Fig. 7, the distal portion 77 would be inclined relative to the base 7 as is the distal portion 11a of the male wedge receiver 11'.

In Figs. 9 and 10 is illustrated a constructional form using male wedge receivers of the type illustrated in Fig. 8 in a chair construction having a horizontal seat rail or frame 82 connected to a chair back, having the upward extension 88 forming the back of the chair, and the lower extension 89 forming a leg of the chair at the right end of the rail, while the left end 82 of the rail is attached to the forward leg 87 of the chair. T-shaped slots 90, 91 and 92 are disposed vertically at each end of the horizontal rail 82 for the accommodation of the female wedge receiver embodying spaced U-shaped sheet metal loops 95, 96, the distal edges of which converge from the upper end of the slots towards the lower end thereof. The female wedge receiver used in this embodiment may be similar to that illustrated in Fig. 3.

A recess 9 is formed in the chair back for the purpose of affixing the male wedge receiver 75 to the chair back and rear leg by means of screws 80, so that the U-shaped sheet metal loop projects beyond the abutting surfaces and between the spaced loops 95 and 96 of the female wedge receiver. Thereupon, a flat sheet metal wedge 81, having opposed inclined edges corresponding to the relative inclination between the distal edges of the loops 95, 96 and the distal edge of loop 75 is forced downwardly to obtain a tight interengagement between the parts and particularly a tight fit at the abutting surfaces of the horizontal rail 82 and back 88, 89. A notch 81' may be formed in one edge of the sheet metal wedge 81 to facilitate the withdrawal of the wedge incidental to a dismantling of the component parts of the piece of furniture.

Figs. 9 and 10 illustrate the attachment of a male wedge receiver 83 within a recess near the top of the front leg 87 of the chair by means of screws 86 engaging the base 85. The distal edge 84 of the male wedge receiver may be parallel or inclined to the base so long as the relative angularity between this distal portion and the distal parts of the female wedge receiver 95 correspond to the inclination of the opposed edges of the sheet metal wedge to effect a tight interengagement between the parts when the wedge is driven down towards the restricted end of the rectangular passages formed in the interengaging sheet metal loops. As clearly shown in Figs. 9 and 10, the fastener assembly is completely hidden within recesses and grooves in the component parts of the chair unit so that the assembly affords a pleasing appearance and makes possible the completion of the unit by the affixation of chair pads or other trim following the interconnection of the parts.

Figs. 11 to 17 illustrate another embodiment of the invention which is particularly economical and rugged in construction and which enables an accurately finished interconnection between the parts to be attained in the course of assembly. The invention is illustrated as applied to the interconnection between a vertical structural member A and a horizontal structural member B which may be components of many items of furniture such as tables and legs therefor, chair seats or rails and legs or backs interconnected therewith, bed-rails and heads, screen frames, etc. The objective of the invention is to provide a tight fit between the abutting surfaces $a$ and $b$ of structural members A and B, respectively. For this purpose a slot or recess $c$, preferably of key-hole configuration, is formed in structural member A, having a rectangular portion adjacent to the abutting surface $a$ and an enlarged portion of circular cross-section merging therewith interiorly of the member A. An ordinary slot, of generally rectangular cross-section, is formed in structural member B adjacent to the abutting surface $b$. A female wedge receiving member, illustrated in Fig. 17, formed of stamped and shaped sheet metal, is inserted in slot $c$. This wedge receiving member may be formed with a plurality of sheet metal loops 101, which have been illustrated as three in number, spaced from each other by a pair of intervening gaps 107. The sheet metal loops 101 are capped by the distal edges 102 which are disposed in a continuous straight line and which are shown as parallel to the abutting surface $a$ of structural member A with no part thereof projecting above this surface. The opposite ends of the side walls 101 distend into curved portions 103 of circular configuration and approach closely to each other at the gap 104. The cross-sectional outline of the female wedge receiver 100 corresponds to the outline of the recess $c$ of key-hole cross-section and the same may be seated therein without any extraneous fastenings. However, it is preferable that notches 105 in the meeting edges of the curved loops 104 be provided for the purpose of accommodating screws 106 in order to securely seat the female wedge receiver 100 within its slot.

The male wedge receiver 109, as shown in Fig. 16, is disposed within the slot $d$ within structural member B and is formed of an integral stamped and shaped sheet metal sheet providing spaced sheet metal loops 110 having distal portions 111 and a base portion 112 for seating within the slot $d$. The male wedge receiver 109 is bent symmetrically from the longitudinal axis of its distal portions 111 so that the base portions 112 provide a stable seat for the male wedge receiver within its slot, particularly in consequence of the protuberances 113 which may be formed at the ends and at an intermediate part of the base 112 for the accommodation of fastening screws 115 to positively seat the male wedge receiver within its recess with the U-shaped sheet metal loops 110 extending beyond the abutting surface $b$ for reception within the spaces 107 between the U-shaped sheet metal loops 101 of the female wedge receiver 11, as shown in Fig. 13.

The distal portions 111 on the male wedge receiver 109 are inclined relatively to the distal portions 102 of the female wedge receiver 100, so that when a sheet metal wedge 120, as illustrated in Fig. 13, is forced into the rectangular passages between the side walls of the U-shaped sheet metal loops, the parts are forced together in consequence of the angularity between the opposed edges 121 and 122 of the sheet metal wedge corresponding to the relative inclination of the distal edges 111 of the male wedge receiver relative to the distal edges 102 of the female wedge receiver. After the wedge is driven home to obtain a tight interconnection between the parts, the wedge may be locked in place by means of bending down the projection 108 extending from the outermost loop 102 against the inclined edge 124 at the larger driving end of the wedge 120. If a disassembly of the parts is desired, this projection 108 may be bent back to permit the wedge 120 to be retracted by the engagement of a hooked instrument which may be conveniently inserted in the enlarged circular portion of the slot $c$ to engage the projection 125 in the interior of the slot at the large driving end of the wedge 120.

While it is preferable that the distal portions of the female wedge receiver 122 be disposed in parallel to the abutting surface $a$ of the structural unit, the objectives of the invention may be realized if these distal edges are inclined relative to the abutting surface so long as they do not extend therebeyond, for cooperation with correspondingly parallel or relatively inclined distal edges of the U-shaped sheet metal loops of the male wedge receiver. Of course, the objectives of the invention may be attained by using less or more than three U-shaped sheet metal loops on the female wedge receiver cooperating with the two U-shaped sheet metal loops on the male wedge receiver, as shown in the illustrated embodiment.

In Figs. 18 to 22 is shown another embodiment of the invention utilizing some of the features illustrated in connection with the embodiments previously described. In this structural form is illustrated the attachment of a table leg L to the underside of a table top T by means of a female wedge receiver formed of a pair of spaced U-shaped sheet metal loops 130 having the lateral flanges 131 cooperating with a T-shaped slot 129 for affixing the sheet metal loops to the structural member L at their proximal parts. The distal edges 132 of the sheet metal loops extend along a straight line substantially parallel to the abutting surface of the table leg L and the table top therebelow.

The male wedge receiver 140, for cooperation with the female wedge receiver 130 is shown in Fig. 22 and may be affixed to the underside of a table top by means of screws 145 being driven into openings 141 in the lateral flanges 149. The distal edge 142 of the male wedge receiver is preferably slotted at 143 to include part of the side walls, which slots or notches align with upstanding projections 135 in the female wedge receiver in the plane of the side walls of the sheet metal loops. This interengagement aids in the alignment of the parts, and the subdivision of the male wedge receiver into two loops further facilitates the adaptation of the edges of the wedge to distal edges of the loops. The distal edges 142 are inclined relatively to the distal edges 132 so that when the flat sheet metal wedge W is driven into the rectangular passages formed between the side walls and distal edges of the sheet metal loops, the parts L and T are forced towards each other with a tight fit. In order to obtain this tight abutting contact between the elements it is necessary that the leg L be undercut at 146 to clear the flanges 149 and the attaching screws 145.

When furniture units do not lend themselves to this structural expedient of undercutting, an alternate form of metal wedge receiver as shown in Fig. 23 may be used. This wedge receiver is bent symmetrically from a piece of sheet metal to define rectangular passages 151' between side walls 150 and 151 which are bounded by distal edges 152 and the base 156. The ends of the base 156 are formed with protuberances 155 which nearly merge at the gaps 157 to define substantially circular openings for accommodating screws, the heads of which serve to seat the wedge receiver in a groove or recess provided therefor in a manner similar to that shown in Figs. 9, 13 and 16.

While the advantages of the invention may be realized with the utilization of flat sheet metal wedges having the opposite edges thereof correlated to the distal edges of the interengaging sheet metal loops into which said wedges are driven, special manufacturing economies and advantages result from a stamping of the wedges in a manner as indicated in Fig. 24, particularly those which are adapted to be used with key-hole slots, as illustrated in the embodiment shown in Figs. 11 to 17. As indicated in Fig. 24, the wedges 120 with the opposing edges 121, 122, inclined edge 124 and hook 125, may be stamped complementarily with a minimum amount of scrap as indicated by the quadrangular elements S. On the other hand, the stamping of corresponding wedges of the type used in the structural forms illustrated in Figs. 9, 10, 18 to 20, results in a larger amount of waste as indicated by the intervening parts S' disposed between the wedges and representing scrap metal.

This application is a continuation in part of my application Serial No. 273,723, filed February 27, 1952, now abandoned.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. A fastener assembly for interconnecting a pair of structural members in abutting surface relation, comprising integral aligned spaced elongated U-shaped sheet metal loops disposed in a recess in one of said members and affixed thereto at their proximal parts and defining, together with their distal parts and the opposite side walls of said loops, a plurality of substantially rectangular passages with at least one space therebetween, the spacing between the side walls of each loop being a fractional part of the length of said loops and the distal parts thereof lying entirely within said recess without extending beyond the abutting surface of said one member, said recess being of keyhole configuration and comprised of merging portions of rectangular and circular cross-section with said loops distending from the side walls in the rectangular portion into the circular portion of the recess in congruity therewith, said second member having a U-shaped sheet metal loop affixed thereto and projecting beyond the abutting surface of said second member to interengage said first-mentioned loops in said space therebetween to define a common coextensive passage between the side walls of the loops affixed to the two structural members, the distal edges of the respective loops remote from the points of affixation to their respective structural members being inclined relative to each other along straight continuous lines, and a flat sheet metal wedge having the opposite edges thereof straight and conforming to said relative inclinations of said distal edges and of a thickness to enable rectilinear movement in said rectangular passages, whereby a reciprocating movement of said wedge in a direction towards the restricted ends of said passages is translated into a movement between the members in a transverse direction and a permanently forceful connection therebetween at their abutting surfaces.

2. A fastener assembly for interconnecting a pair of structural members in abutting surface relation, comprising integral aligned spaced elongated U-shaped sheet metal loops disposed in a recess in one of said members and affixed thereto at their proximal parts and defining, together with their distal parts and the opposite side walls of said loops, a plurality of substantially rectangular passages with at least one space therebetween, the spacing between the side walls of each loop being a fractional part of the length of said loops and the distal parts thereof lying entirely within said recess without extending beyond the abutting surface of said one member, said second member having a U-shaped sheet metal loop affixed thereto and projecting beyond the abutting surface of said second member to interengage said first-mentioned loops in said space therebetween to define a common coextensive passage between the side walls of the loops affixed to the two structural members, said last-mentioned loop having a base seated within a groove formed in said second member below the abutting surface thereof, fastening screws engaging the ends of said base within said groove to affix said sheet metal loop to said second member, the distal edges of the respective loops remote from the points of affixation to their respective structural members being inclined relative to each other along straight continuous lines, and a flat sheet metal wedge having the opposite edges thereof straight and conforming to said relative inclinations of said distal edges and of a thickness to enable rectilinear movement in said rectangular passages, whereby a reciprocating movement of said wedge in a direction towards the restricted ends of said passages is translated into a movement between the members in a transverse direction and a permanently forceful connection therebetween at their abutting surfaces.

3. A fastener assembly as set forth in claim 2 wherein the U-shaped sheet metal loop affixed to said second structural member is formed symmetrically with respect to the longitudinal axis of the distal portion thereof, and the base being enlarged adjacent to the proximal ends thereof for accommodating the fastening screws between the sides of the base and with the heads thereof against the top of the base.

4. A fastener assembly for interconnecting a pair of structural members in abutting surface relation, comprising integral aligned spaced elongated U-shaped sheet metal loops disposed in a recess in one of said members and affixed thereto at their proximal parts and defining, together with their distal parts and the opposite side walls of said loops, a plurality of substantially rectangular passages with at least one space therebetween, the spacing between the side walls of each loop being a fractional part of the length of said loops and the distal parts thereof lying entirely within said recess without extending beyond the abutting surface of said one member, said recess at said abutting surface being of sufficient width to accommodate said U-shaped sheet metal loops and enlarged therebelow for anchoring said loops within the recess, said second member having a U-shaped sheet metal loop affixed thereto and projecting beyond the abutting surface of said second member to interengage said first-mentioned loops in said space therebetween to define a common coextensive passage between the side walls of the loops affixed to the two structural members, the distal edges of the respective loops remote from the points of affixation to their respective structural members being inclined relative to each other along straight continuous lines, a flat sheet metal wedge having the opposite edges thereof straight and conforming to said relative inclinations of said distal edges and of a thickness to enable rectilinear movement in said rectangular passages, whereby a reciprocating movement of said wedge in a direction towards the restricted ends of said passages is translated into a movement between the members in a transverse direction and a permanently forceful connection therebetween at their abutting surfaces, said wedge having a projection at its enlarged end which is accommodated in the enlarged portion of the recess in said member and which may be engaged with a hooked member to effect a withdrawal of the wedge.

5. A fastener assembly as set forth in claim 4 wherein the sheet metal wedge is provided with an inclined edge at its enlarged end and a protrusion beyond the distal edge of the outermost U-shaped sheet metal loop for bending against said inclined edge to retain the wedge in place.

6. A fastener assembly as set forth in claim 4 wherein the recess in the first structural member is of key-hole configuration with the U-shaped sheet metal loops seated therein of conforming outline and formed symmetrically with respect to the median line passing through the distal parts of said loops, said distal parts being disposed adjacent to the abutting surface of said first-member and in parallel thereto.

7. A fastener assembly as set forth in claim 6 wherein the U-shaped sheet metal loop affixed to the second member is seated within a groove therein and is formed symmetrically with respect to the median line passing through the distal part of said loop, said distal part projecting into the recess in the first member for interengagement with the U-shaped sheet metal loops therein and disposed angularly with respect to the distal parts of the latter.

8. A fastener assembly as set forth in claim 7 wherein fastening screws engage the U-shaped sheet metal loops in the pair of structural members to retain them in place.

References Cited in the file of this patent

UNITED STATES PATENTS

| | | |
|---|---|---|
| 307,040 | Hammerl | Oct. 21, 1884 |
| 423,535 | Taylor | Mar. 18, 1890 |
| 442,560 | Vaughn | Dec. 9, 1890 |
| 1,076,838 | Okun | Oct. 28, 1913 |
| 1,095,636 | Hummer | May 5, 1914 |
| 1,204,866 | Haney | Nov. 14, 1916 |
| 1,506,442 | O'Hara | Aug. 26, 1924 |
| 1,625,612 | Jensen | Apr. 19, 1927 |
| 1,719,921 | Bosco | July 9, 1929 |
| 1,742,141 | Hicks | Dec. 31, 1929 |
| 1,755,553 | Monteith | Apr. 22, 1930 |
| 2,435,286 | Manhard | Feb. 3, 1948 |
| 2,461,648 | MacLeod | Feb. 15, 1949 |
| 2,584,471 | Kohen | Feb. 5, 1952 |
| 2,620,248 | Mutchnik | Dec. 2, 1952 |
| 2,673,775 | Silverman | Mar. 30, 1954 |